UNITED STATES PATENT OFFICE.

THOMAS S. B. WOOD, OF SHARON, PENNSYLVANIA.

PROCESS OF MANUFACTURING MINERAL WOOL.

SPECIFICATION forming part of Letters Patent No. 533,771, dated February 5, 1895.

Application filed July 3, 1894. Serial No. 516,501. (No specimens.)

*To all whom it may concern:*

Be it known that I, THOMAS S. B. WOOD, of Sharon, in the county of Mercer and State of Pennsylvania, have invented a certain new and useful Process of Manufacturing Mineral Wool, of which the following is a full, clear, and exact description.

The object of the invention is to provide a new and improved process for the manufacture of mineral wool, whereby the cost of manufacture is greatly cheapened, the destruction to the lining of the cupola is reduced to a minimum, and the product has a finer appearance, its color being more of a bluish white instead of the yellowish white as in the mineral wool heretofore produced. The process consists in melting in a cupola, slag or scoria with fluor-spar, and converting the melted product into mineral wool.

In order to carry this process into effect I proceed in detail as follows: The cupola is charged with layers of coke, scoria or cinder, and fluor-spar in the order named. Then the blast is turned on and the scoria or cinder is melted with the aid of the fluor-spar as the flux. The molten product is run from the tap hole of the cupola along an iron trough and in dropping off the trough onto the ground is struck by a blast of steam or air to blow or convert the product into mineral wool.

The charging of the cupola with coke, scoria and fluor-spar is kept up continuously the same as in a blast furnace. I have found that twenty-five pounds of coke to two-hundred pounds of scoria and two pounds of fluor-spar makes a good charge, it being however, understood that the amount of fluor-spar depends greatly on the quality and physical structure of the scoria or cinder, and hence must be varied for different kinds of scoria. The amount of fluor-spar to be used with any given quantity of scoria can be easily and practically determined by trying a charge or two and after examining the wool product and the taps or cinders that have escaped and have not formed into mineral wool, the operator is enabled to determine whether the amount of fluor-spar for each charge is sufficient or has to be increased or diminished.

The scoria or cinder used is preferably of the ordinary blast furnace kind, and requires no preparation other than seeing that no metallic iron scrap is contained in it at the time it is placed in the cupola, it being understood that any such scrap is thrown out by the filler in charge of the cupola.

Having thus described my invention, I claim as new and desire to secure by Letters Patent—

The herein described process for the manufacture of mineral-wool consisting in melting, in a cupola, slag or scoria, with fluor-spar and converting the molten product into mineral wool, substantially as shown and described.

THOMAS S. B. WOOD.

Witnesses:
  JAMES R. WHEETA,
  J. E. WOOD.